United States Patent [19]

Behar et al.

[11] 4,221,893
[45] Sep. 9, 1980

[54] BROMINATED BISHENOL-A EPOXY COMPOSITIONS

[75] Inventors: Meir Behar, Beer Sheva; Ori Peshes, Omer; Aharon Liebersohn, Beer Sheva, all of Israel

[73] Assignee: Makhteshim Chemical Works Limited, Beer Sheva, Israel

[21] Appl. No.: 971,640

[22] Filed: Dec. 20, 1978

[30] Foreign Application Priority Data

Jan. 11, 1978 [IL] Israel ............................... 53778

[51] Int. Cl.$^2$ ............................................. C08L 63/00
[52] U.S. Cl. ................................... 525/438; 260/2.3; 260/45.75 B; 260/459 A; 260/348.36; 525/529; 568/726; 568/779; 528/102; 260/348.13; 260/348.49
[58] Field of Search ............. 528/102; 260/2.3, 348.15, 260/348.36, 45.75 B, 45.8 A; 568/726, 779; 525/438, 529

[56] References Cited

U.S. PATENT DOCUMENTS

| | | | |
|---|---|---|---|
| 2,939,859 | 6/1960 | Rumscheidt | 525/529 |
| 3,016,362 | 1/1962 | Wismer | 528/102 |
| 3,058,946 | 10/1962 | Nametz | 528/102 |
| 3,182,088 | 5/1965 | Hennis | 568/726 |
| 3,234,289 | 2/1966 | Hennis | 568/726 |
| 3,363,007 | 1/1968 | Majewski | 568/726 |
| 3,546,302 | 12/1970 | Asadorian | 568/726 |
| 3,929,908 | 12/1975 | Orlando | 528/102 |

FOREIGN PATENT DOCUMENTS

1316415 5/1973 United Kingdom .

*Primary Examiner*—Paul Lieberman
*Attorney, Agent, or Firm*—Browdy and Neimark

[57] ABSTRACT

According to the present invention there are provided novel flame retardant brominated bisphenol epoxy compositions comprising the reaction product of the residue of the production of tetrabromo-bisphenol A (TBBA) with epichlorohydrin, and a process for the production of such compositions which comprises dissolving such residue in an excess of aqueous alkali, reacting the residue with epichlorohydrin at elevated temperature, neutralizing excess of alkali remaining after the reaction and recovering the brominated epoxy compositions.

The compositions thus obtained are useful as flame retardants. There may be optionally incorporated in same compounds such as antimony trioxide.

9 Claims, No Drawings

BROMINATED BISHENOL-A EPOXY COMPOSITIONS

FIELD OF THE INVENTION

The present invention relates to brominated bisphenol epoxy compositions, and more particularly to such compositions obtained by the reaction of waste residues resulting from the manufacture of tetrabromo-bisphenol-A, TBBA. The invention further relates to a process for the treatment of waste residue from the manufacture of tetrabromo-bisphenol-A (TBBA) resulting in a highly brominated bisphenol epoxy composition which is a valuable flame retardant. Such product is valuable as additive to plstics and resins and especially as additive to reinforced polyester resins.

BACKGROUND OF THIS INVENTION

In the manufacture of tetrabromo-bisphenol-A, the end product is usually recovered from the bromination reaction by crystallization from solvent. The remaining mother liquor generally contains between 2–15% solids, constituting brominated phenolic material which is substantially tetrabromo-bisphenol-A referred to as TBBA. However, other brominated phenolic products are also present as impurities in the mother liquor, and make further recovery of desited tetrabromo-bisphenol A in a reasonably pure form extremely difficult. These impurities generally comprise brominated bisphenol-A at various stages of bromination, brominated phenols resulting from the cleavage of the bisphenol, and other small amounts of bromine containing oxidation products produced by side reactions during the bromination process. When the mother liquor of the recovered pure tetrabromo-bisphenol-A (TBBA) is evaporated to dryness the residue is a dark coloured product containing about 57–60% bromine comprising the impurities and tetrabromo-bisphenol-A (TBBA) mixed together and melting at about 70–80° C.

Tetrabromo-bisphenol-A (TBBA) is used as a flame retardant additive or as an intermediate in the preparation of flame retardant polymers. As such it has been reacted with polycarboxylic acids to form polyesters, it has been used in the preparation of flame retardant polycarbonate resins, and it has also been used in flame retardant epoxy resins by incorporating it as a replacement or partial replacement for bisphenol-A in the resins. For these purposes it is generally desirable to use a high grade TBBA, and the manufacturers of TBBA have attempted to optimize their processes to give high purity TBBA and reduce the amount of waste residue which has to be discarded. U.S. Pat. Nos. 3,546,302; 3,182,088; 3,234,289; 3,367,007 and Gt. Brit. Pat. No. 1,316,415 among others, describe processes for preparing TBBA.

Generally, in the process for preparing brominated bisphenols, the mother liquor remaining after crystallization of product, and which comprises usually an organic solvent, is distilled and the residue disposed of. However, the residue contains phenolic and brominated phenolic products which for ecological reasons require special disposal consideration. Furthermore, these residues in some processes contain lacrymatory impurities which complicate the disposal problem.

SUMMARY OF THE INVENTION

We have unexpectedly discovered that this residue which was hitherto considered a waste problem and a nuisance, can be converted into a useful product in accordance with this invention as will be set out in the following.

When the tetrabromo-bisphenol-A (TBBA) residue waste is reacted with epichlorohydrin in the presence of aqueous base there is obtained an epoxy composition having a very high bromine content and which can be used as flame retardant additive in various polymeric compositions.

The epoxy compositions of this invention may not satisfy the standards and demands generally set for epoxy resins used in coatings and other epoxy resin applications where substantially pure starting materials are required and where the epoxy resin is a major portion of the plastic composition. However, as additives used at less than 50% resin composition they are quite satisfactory, particularly where color is not a factor.

The tetrabromo-bisphenol-A residue in accordance with this invention may be reacted with epichlorohydrin in a ratio of from 1:1 to 1:10 but preferably from 1:1.2 to 1:2. The mole ratio of reactants will of course determine the molecular weight of the product composition. The higher the epichlorohydrin ratio the lower the molecular weight of the epoxide. Any excess epichlorohydrin can be distilled and recovered. Another common method for regulating the molecular weight of the product is by adding to the reaction small quantities of monohydric phenols such as phenol or halogenated phenols, for example bromo-phenol.

The tetrabromo-bisphenol-A residue may be dried and collected from the manufacturing process prior to reacting it with epichlorohydrin or preferably it can be stripped of the solvent in the same vessel used for the epichlorohydrin addition.

The brominated bisphenol epoxy composition according to this invention is produced by reacting the tetrabromo-bisphenol-A manufacturing residue with strong aqueous base such as, for example, sodium hydroxide or potassium hydroxide and then reacting with epichlorohydrin at elevated temperature, washing the organic portion with water, neutralizing the excess base and stripping off the remaining water. The product is a brown colored solid or viscous liquid depending on the mole ratios of reactants used. The solid products can be ground to a powder. In general the method and conditions for preparing these epoxy compositions is similar to that known in the art of epoxy resin manufacture. Thus the molecular weight of these epoxy compositions can be controlled by the ratio of reactants or by introducing small amounts of monomeric phenols such as brominated monocyclic phenols into the reaction as chain stoppers.

In the case of thermosetting polyester resins, tetrabromo-bisphenol-A itself cannot be used as flame retardant additive because the phenolic hydroxy groups interfere in the curing reaction. Epoxidized tetrabromo-bisphenol-A made from commercial tetrabromo-bisphenol-A is prohibitively expensive and has therefore not been used in practice for this application. The brominated bisphenol epoxy compounds of this invention, however, are satisfactory both as regards cost and effectiveness for use as flame retardant additives in polyester resins. They are particularly advantageous in polyester because of their good compatability.

The brominated bisphenol epoxy composition of this invention may be used as flame retardant additive for polymers with which it is compatible. It may be used directly or it can be blended first with other materials to provide flame retardant additive compositions.

Suitable materials with which the brominated-bisphenol epoxy composition of this invention may be blended to form flame retardant additives compositions are, solvents, crosslinking monomers, pigments, dyes, fillers and other flame retardant chemicals. Examples of these are styrene, divinylbenzene, diallylphthalate, antimony trioxide and other chlorine, bromine and phosphorous containing compounds known in the art for their flame retardant properties.

A preferred blend is that of the brominated bisphenol epoxy composition with styrene and/or antimony trioxide.

Such blends may contain from 60 to 99% brominated bisphenol epoxy composition. For application in polyester resins, suitable blends contain from 60% to 95% brominated bisphenol epoxy compositions, 5% to 25%, preferably 10% to 15%, crosslinking monomer, and optionally 5% to 25%, preferably 10% to 15%, antimony trioxide.

The final polyester composition will generally contain from about 50-80 parts alkyd, 50 to 20 parts crosslinking monomer and about 10 to 45 parts preferably 15-35% brominated epoxy composition and optionally 2-10 parts $Sb_2O_3$. The invention is illustrated by the following examples which are not to be considered limiting.

EXAMPLE 1

A quantity of 2 liters 15% aqueous sodium hydroxide was heated to 50° C., 900 grams TBBA residue were added and dissolved in the solution of the hydroxide. 180 g epichlorohydrin were added quickly and the reaction mixture was heated to 95° C. and maintained at this temperature during 40 minutes, with stirring. At the end of this period of time the stirring was stopped and aqueous upper phase was decanted. The remaining substance was washed with hot water (90° C.) which was decanted. The residue was again washed with 90° C. water while carbon dioxide was bubbled through until any excess base was neutralized to pH7. Residual water was decanted and the remaining water was distilled off at a reactor temperature of 150° C. There was obtained a brown semitransparent epoxy resin and this was easily milled to a powder. The epoxy number of the product was 600 to 800.

EXAMPLE 2

42.5 g of methylene dichloride mother liquor from the recrystallization of tetrabromo bisphenol A, containing 45% TBBA residue was introduced into a flask equipped with stirrer, thermometer, and addition funnel. 14.7 g water and 6 g 45% solution of NaOH were added and the mixture was stirred and slowly heated to distill the methylene dichloride. When the temperature reached 50° C., 5.36 g epichlorohydrin was added. The temperature is raised to 95° C. for 40 minutes. The stirring is stopped and the aqueous phase is separated. The organic phase is washed at this temperature with 20 g water and finally neutrallized with acetic acid. The residual water is removed by heating up to 160° C. pot temperature. The product upon cooling is removed and is a brown solid softening at 50° C. It has an epoxy value of 700 and bromine content of 53%.

EXAMPLE 3

The same procedure as in example 2 was followed except that at the end of the reaction after the residual water has been removed by distillation, the reaction mixture is cooled to 120° C. 4 g antimony trioxide is added and at 110° C. 4 g styrene is added. The product is cooled and collected. The product, a viscous liquid has an epoxy value of 700 and a bromine content of 49%.

EXAMPLE 4

125 g of product of example 1 was blended with 250 g general purpose polyester alkyd (Crystic 600) at 150° C. 240 g styrene was added with vigorous stirring and the mixture was cooled to 70° C. The product had a viscosity of 1000 C.P. To 150 g of this product was added 6 g $Sb_2O_3$ and 2% methylethyl ketone peroxide (calculated on the weight of the resin). The resin was coated on three layers of 1.5 oz glass fibers MK10B. The material underwent gelation during 15 minutes and the final hardening was effected at 80° C. in an oven. The resulting laminate had a Barcol hardners of 45-50; and LOI of 40 and was self extinguishing even when exposed to an open flame.

To prepare starting material for the brominated bisphenol epoxy compositions, methylene dichloride mother liquors from the crystallization of tetrabromo bisphenol A containing brominated waste products were treated as follows.

To 400 liters of liquor was added 200 liters 16% NaOH in water. The mixture was heated to 80° C. and the methylene dichloride which distilled out was recovered. 200 liters water was added and this aqueous mixture was used for preparing brominated bisphenol epoxy compositions according to this invention.

EXAMPLES 5-8

The following series of experiments were conducted. The aqueous sodium hydroxide solution containing waste TBBA was heated to 50° C., and additional solid TBBA waste was added to a maximum of 1:1 waste to water ratio. Additional 50% aqueous NaOH was added to supply about 1-2 moles base per mole epichlorohydrin. Phenol or bromophenol were added and the mixture heated to 50° C. with stirring. Epichlorohydrin was added and the temperature raised to 90°-100° C. for 40 minutes. Toluene was then added and stirring continued for 30 minutes at 85° C. The mixtures were neutralized with dilute HCl and the pH adjusted to 6 with phosphate buffer. After 30 minutes the upper aqueous phase was decanted and the organic phase washed with water several times. The residual water was distilled azeotropically and the toluene was distilled up to 160° C. pot temperature under vacuum. The temperature was reduced to 120° C. and antimony trioxide was added while stirring. The temperature was further reduced to 110° C. and styrene was slowly added. The batch was cooled to 50° C. and ready for use as flame retardant composition.

These compositions were blended (20%) with a standard polyester composition (Crystic 196) to give 49-53.3% bromine content to the resin. After curing the LOI values were determined.

|                          |      | Example 5 | Example 6 | Example 7 | Example 8 |
|--------------------------|------|-----------|-----------|-----------|-----------|
| Waste TBBA NaOH soln.    | (kg) | 34.8      | 39.5      | 38        | 49        |
| Concentration            | (%)  | 26.2      | 26.56     | 27        | 32.65     |
| Waste TBBA solids added  | (kg) | 3         | 3.5       | 4.1       | 6.4       |
| Phenol                   | (kg) | —         | 0.7       | 0.72      | 1.1       |
| Bromphenol               | (kg) | 1.1       | —         | —         | —         |
| Epichlorohydrin          | (kg) | 3.8       | 4.36      | 4.48      | 6.1       |
| Toluene                  | (l)  | 4.5       | 4.7       | 4.8       | 7.5       |
| Antimony trioxide        | (kg) | 2.0       | 3.05      | 3.14      | 4.8       |
| Styrene                  | (kg) | 2.0       | 3.05      | 3.14      | 4.8       |
| Yield %                  |      | 94        | —         | 95        | 93        |
| Epoxy vo                 |      | 927       | 902       | 830       | 828       |
| % Bromine in resin       |      | 53.3      | —         | 49        | 51        |
| LOI                      |      | 28.2      | 29.1      | 29        | —         |

EXAMPLE 9

A general purpose polyester resin (Crystic 196) was blended epoxy composition of example 3 at 20% and 27% additive and compared with the same general purpose polyester resin containing a commercial chlorinated flame retardant additive. The results are tabulated below:

| TEST | G.P. Resin +20% Example 3 | G.P. Resin +27% Example 3 | G.P. Resin +20%[5] Commercial Additive | G.P. Resin Control |
|------|---------------------------|---------------------------|----------------------------------------|--------------------|
| LOI[1] | 29.3 | 35.3 | 29.3 | 20.6 |
| HLT-15[2] | 100 0 sec | 100 | 88 0 sec | 4 |
| DS35-74[3] | SE 5 mm | — | SE 5 mm | B-2.24 |
| Flexural Strength[1] | 229.3 kg/cm² | — | 1742.4 kg/cm² | 2253.6 kg/cm² |
| Flexural Modulus[1] | 4.98 × 10⁴ kg/cm² | — | 3.86 × 10⁴ kg/cm² | 4.92 × 10⁴ kg/cm² |
| Water Absorption[4] | 0.15% | — | 0.15% | 0.21% |

[1] LOI = Limiting Oxygen Index Test performed on laminates containing 25% CSM glass fibers
[2] Flame test of Hooker
[3] ASTM Test
[4] Test performed on castings, 24 hrs.
[5] Long chain chlorinated fire retardant additive at recommended level.

It is apparent from this example that the brominated bisphenol epoxy compositions of this invention provide excellent flame retardant properties when added to polyester resins and at the same time do not deteriorate other desirable physical properties of the product resin as for example flexural strength and flexural modulus.

We claim:

1. A flame retardant brominated bisphenol epoxy composition comprising the reaction product between the residue from the manufacture of tetrabromo-bisphenol-A with epichlorohydrin.

2. A composition according to claim 1 wherein the mole ratio of residue to epichlorohydrin is from 1:1 to 1:10.

3. A flame retardant brominated-bisphenol epoxy composition according to claim 1 comprising from 60% to 99% by weight of a reaction product between the residue from the manufacture of tetrabromo-bisphenol-A with epichlorohydrin and from 5% to 25% by weight of a crosslinking monomer.

4. A flame retardant brominated bisphenol epoxy composition according to claim 1 comprising 3% to 25% by weight antimony trioxide.

5. A flame retardant brominated-bisphenol epoxy composition according to claim 1 comprising 10 to 15% by weight antimony trioxide and 10 to 15% by weight styrene.

6. A process for preparing a flame retardant brominated bisphenol epoxy composition according to claim 1 which comprises dissolving the residue remaining after the production of tetrabromo-bisphenol-A in an excess of aqueous alkali, reacting this solution with epichlorohydrin at elevated temperature, neutralizing the excess of alkali and recovering the brominated epoxy composition.

7. A process according to claim 6 wherein the alkali is sodium hydroxide and the mole ratio of the residue to epichlorohydrin is 1:1 to 1:10.

8. A self extinguishing polyester resin composition comprising as flame retardant additive 10 to 35 parts by weight per hundred parts of resin of a brominated bisphenol epoxy composition, comprising the reaction product according to claim 1, being the reaction product of the residue of the manufacture of tetrabromo-bisphenol-A with epichlorohydrin.

9. A polyester resin composition according to claim 8 containing 1 to 10 parts by weight antimony trioxide per 100 parts by weight of resin.

* * * * *